US010353767B2

(12) United States Patent
Gianisis et al.

(10) Patent No.: US 10,353,767 B2
(45) Date of Patent: Jul. 16, 2019

(54) USE OF MULTICORE PROCESSOR TO MITIGATE COMMON MODE COMPUTING FAULTS (71) Applicant: BAE Systems Controls Inc., Endicott, NY (US)

(72) Inventors: Dino A. Gianisis, Binghamton, NY (US); Michael G. Adams, Endwell, NY (US)

(73) Assignee: BAE Systems Controls Inc., Endicott, NY (US)

( * ) Notice: Subject to any disclaimer, the term of this patent is extended or adjusted under 35 U.S.C. 154(b) by 140 days.

(21) Appl. No.: 15/704,661

(22) Filed: Sep. 14, 2017

(65) Prior Publication Data
US 2019/0079826 A1    Mar. 14, 2019

(51) Int. Cl.
G06F 11/16 (2006.01)
G06F 11/07 (2006.01)
G06F 12/0842 (2016.01)
G06F 13/42 (2006.01)

(52) U.S. Cl.
CPC ...... *G06F 11/0793* (2013.01); *G06F 11/0721* (2013.01); *G06F 12/0842* (2013.01); *G06F 13/4282* (2013.01); *G06F 2212/62* (2013.01)

(58) Field of Classification Search
CPC . G06F 11/0724; G06F 11/0793; G06F 11/202
USPC .................................................. 714/11, 47.1
See application file for complete search history.

(56) References Cited

U.S. PATENT DOCUMENTS

| 2006/0100750 | A1* | 5/2006 | Platzer | G05D 1/0077 701/3 |
| 2011/0010481 | A1 | 1/2011 | Hamadani et al. | |
| 2012/0023389 | A1 | 1/2012 | Brewerton et al. | |
| 2012/0210172 | A1* | 8/2012 | Gara | G06F 11/1641 714/37 |

(Continued)

FOREIGN PATENT DOCUMENTS

| EP | 1980924 A1 | 10/2008 |
| WO | 2009155993 A1 | 12/2009 |

OTHER PUBLICATIONS

International Search Report, PCT/US18/49442, 11 pages, dated Nov. 21, 2018.

*Primary Examiner* — Chae M Ko
(74) *Attorney, Agent, or Firm* — Scully Scott Murphy & Presser PC (57) ABSTRACT A control system includes a computing channel and an object control channel. The computing channel includes command and monitor lanes. The command lane has a first processor core with a first core architecture receiving input data and generating first data based on the input data. The monitor lane has a second processor core with second core architecture receiving the input data and generating second data based on the input data. The first core architecture and the second core architecture are dissimilar and implemented in a single system-on chip device. The computing channel outputs the first data as command data responsive to determining the first data is matched to the second data. The object control channel corresponds to the computing channel and includes an object control system receiving the command data and generating an object control signal based on the command data to control operation of at least one part of an object system.

21 Claims, 9 Drawing Sheets (56) References Cited

U.S. PATENT DOCUMENTS

2015/0100753 A1\* 4/2015 Shen .................. G06F 12/1027
                                                    711/207
2017/0150241 A1   5/2017 Collin et al.
2017/0277604 A1\* 9/2017 Wang ................. G05B 19/0421

\* cited by examiner

USE OF MULTICORE PROCESSOR TO MITIGATE COMMON MODE COMPUTING FAULTS

FIELD

The present disclosure relates to a safety critical control system, and more particularly to a safety critical control system using dissimilar processor cores for a command lane and a monitor lane in each redundant computing channel to mitigate a common mode fault.

BACKGROUND

Safety critical control systems are required in various applications such as aircraft controls, nuclear shutdown systems, medical instruments, etc. In such applications, since even a single failure could cause human causalities or financial losses, much effort has been made to mitigate failures by using redundant computing channels allowing detections of the failures or back-up in case where at least one channel fails. Each redundant computing channel typically includes a command lane and a monitor lane and employs dissimilar processor cores for each lane's computing block to contribute to the design diversity between the lanes to mitigate the effect of a common mode fault that may cause loss of primary control availability.

The embedded controls industry is migrating towards use of multicore processors to meet the ever demanding increase in throughput capability while lowering dissipated power and increasing reliability. In some prior efforts, respective dissimilar processor cores corresponding to the two lanes of each redundant computing channel are implemented on different system-on-chip (SOC) devices. In this design, however, the separate SOC devices may be implemented on heterogeneous integrated circuits or supplied by different manufactures, thus making it difficult to obtain a similar level of safety or integrity to both lanes.

SUMMARY

In an aspect of the present disclosure, a control system is provided. The control system includes a computing channel and an object control channel. The computing channel includes a command lane and a monitor lane. The command lane has a first processor core with a first core architecture that receives input data and generates first data based on the input data. The monitor lane has a second processor core with a second core architecture that receives the input data and generates second data based on the input data. The first core architecture and the second core architecture are dissimilar to each other and are implemented in a single system-on chip device. The computing channel outputs the first data as command data responsive to determining the first data is matched to the second data. The object control channel corresponds to the computing channel and includes at least one object control system. The object control system receives the command data from the computing channel and generates an object control signal based on the command data to control operation of at least one part of an object system.

In another aspect of the present disclosure, a computing system is provided. The computing system includes a command lane and a monitor lane. The command lane has a first processor core with a first core architecture that receives input data and generates first data based on the input data. The monitor lane has a second processor core with a second core architecture dissimilar to the first core architecture that receives the input data and generates second data based on the input data. The first core architecture and the second core architecture are dissimilar to each other and implemented in a single system-on chip device. The computing system further includes a control logic that receives the first data and the second data and outputs the first data as command data responsive to determining the first data is matched to the second data.

In still another aspect, a computer-implemented method of operating a control system including a computing channel having a command lane and a monitor lane is provided. The method includes receiving input data by a first processor core of the command lane, generating first data based on the input data by the first processor core, receiving the input data by a second core processor of the monitor lane, generating second data based on the input data by the second processor core, and outputting the first data as command data by the computing channel. A first core architecture of the first processor core and a second core architecture of the second processor core are dissimilar to each other and implemented in a single system-on chip device.

DETAILED DESCRIPTION OF THE EMBODIMENTS

Embodiments of the present disclosure will now be described in detail on the basis of the drawings. However, the following embodiments do not restrict the invention claimed in the claims. Moreover, all combinations of features described in the embodiments are not necessarily mandatory for the architecture of the present system and methods. Like numbers are assigned to like elements throughout the description of the embodiments of the present disclosure.

It will be understood that, although the terms first, second, third, etc. may be used herein to describe various elements. Locations of these elements or orders where the elements are arranged should not be limited by these terms. Instead, these terms are only used to distinguish one element from another element.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

The term "match" between first data and second data as used herein does not necessarily only refer to an "exact match" where every element (e.g., bit strings or characters) of the first data is equal to every element of the second data, but can also refer to a "partial match" where the elements of the first data are similar to the elements of the second data within a predetermined acceptable range. By only way of examples, a match can be determined if the first data and the second data have substantially the same elements, but different in e.g., a sequential order in which the elements are arranged; in this example, the first data is represented in a big-endian format (i.e., most significant bit) and the second data is represented in a little-endian format (i.e., least significant bit) or vice versa. In another example, a match can be determined even if several consecutive elements of the first data are identical to several consecutive elements in part of the second data; the match may be determined by setting the predetermined acceptable range (e.g., the number of allowed differences).

Figure 1A:
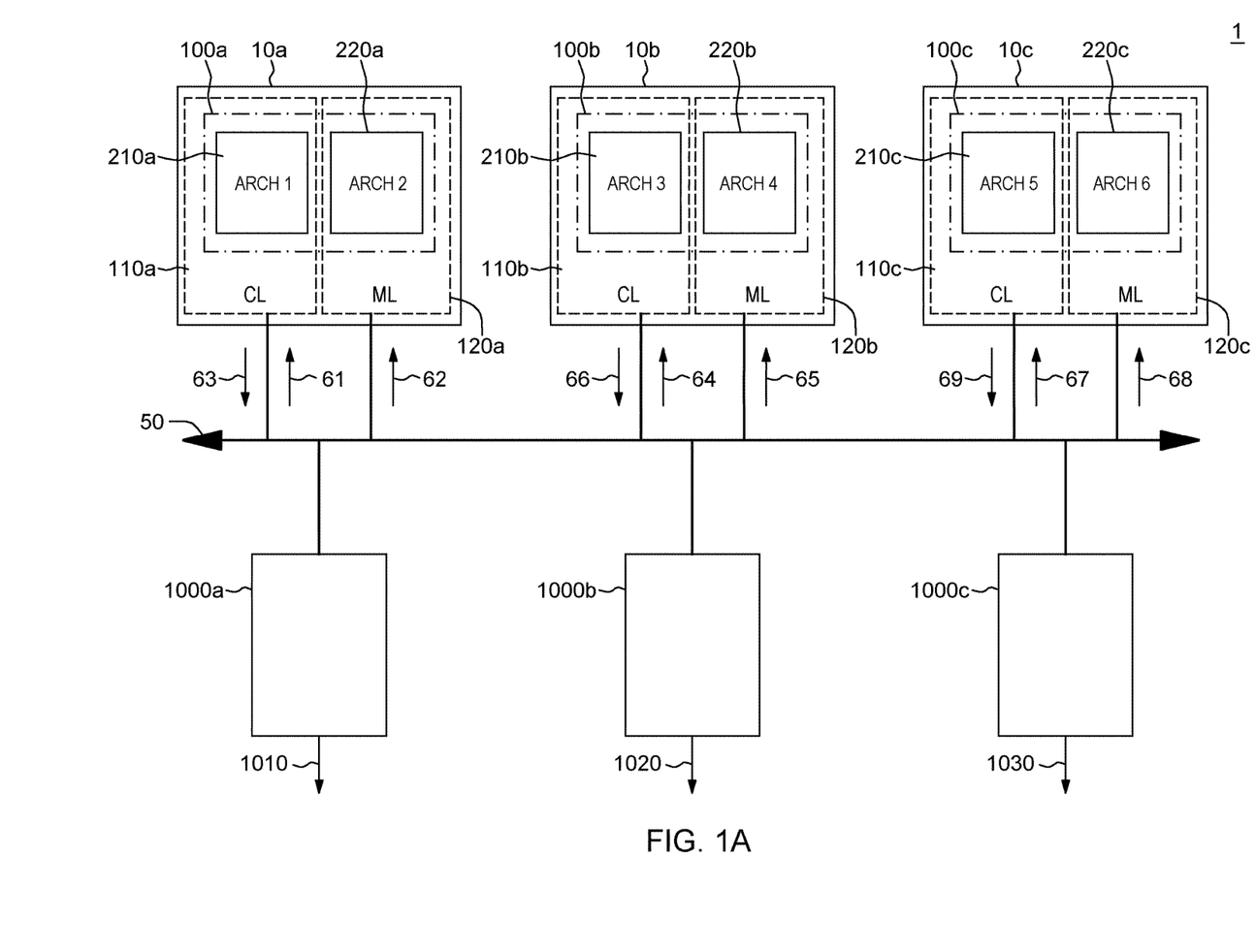
FIG. 1A depicts an example safety critical control system including a plurality of redundant computing channels according to an embodiment of the present disclosure.
Figure 2A:
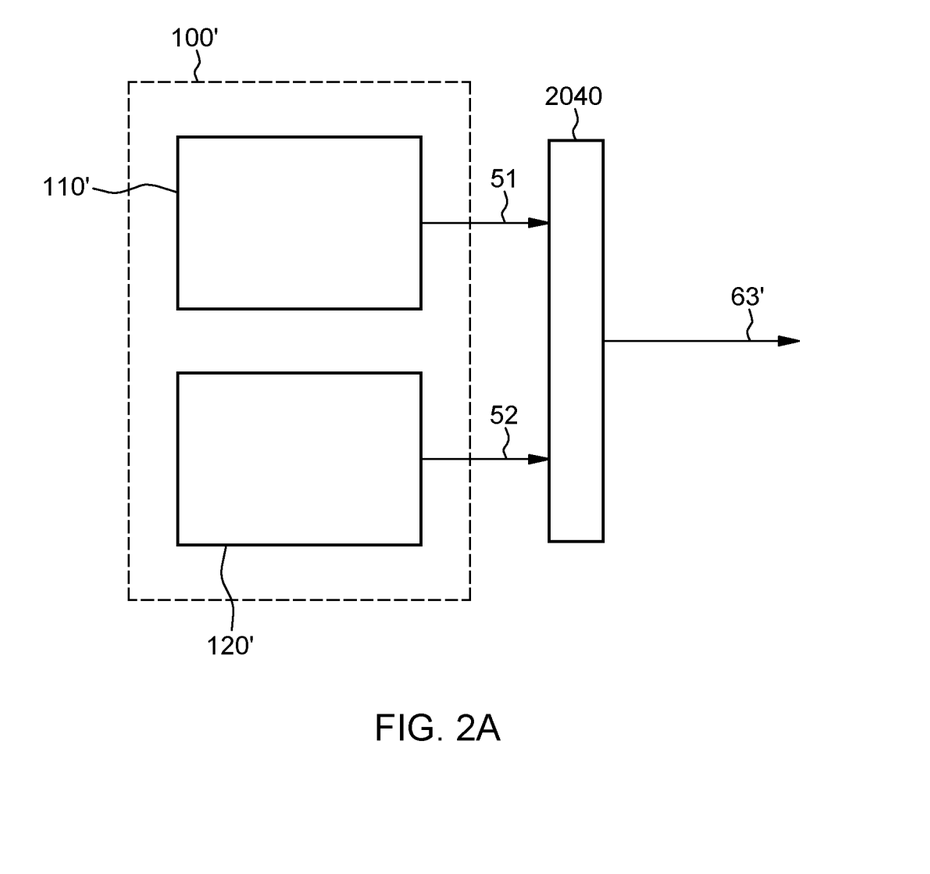
FIG. 2A depicts an example functional block diagram of each redundant computing channel according to an embodiment of the present disclosure.

FIG. 1A depicts an example safety critical control system 1 including a plurality of redundant computing channels $10a$ to $10c$ according to an embodiment of the present disclosure. FIG. 2A depicts an example functional block diagram of each redundant computing channel according to an embodiment of the present disclosure.

As depicted in the example of FIG. 1A, the safety critical control system 1 includes a plurality of redundant computing channels $10a$ to $10c$. The number of redundant computing channels of the present disclosure is not limited to the illustration of FIG. 1A. Each redundant computing channel $10a$ to $10c$ includes two processing lanes such as a command lane and a monitor lane. The redundant computing channel $10a$ includes a command lane $110a$ and a monitor lane $120a$. The redundant computing channel $10b$ includes a command lane $110b$ and a monitor lane $120b$. The redundant computing channel $10c$ includes a command lane $110c$ and a monitor lane $120c$.

In some aspects, each command lane (e.g., $110a$, $110b$, $110c$) of the respective redundant computing channels $10a$ to $10c$ may be referred to as a primary lane for generating command data that can be used to generate a control signal for an object system (not shown), and each monitor lane may be referred to as an auxiliary lane for checking abnormality of the corresponding command lane or the overall redundant computing channel which the command lane and the monitor lane belong to.

In the present disclosure, the object systems may be safety critical systems such as aircrafts with manned and unmanned applications (e.g., drones, unmanned aerial vehicle, etc.), nuclear shutdown systems, medical instruments, or the like, which require controls by safety critical control systems according to the present disclosure.

In the redundant computing channel $10a$ of FIG. 1A, the command lane $110a$ may receive input data 61 related to the object system, process the input data 61 using a processor core $210a$ with a core architecture Arch 1, and generate first output data (not shown in FIG. 1A) based on the processed input data 61. In addition, the monitor lane $120a$ may receive input data 62 substantially the same as the input data 61, process the input data 62 using a processor core $220a$ with a core architecture Arch 2, and generate second output data (not shown in FIG. 1A) based on the processed input data 62. In one embodiment, to enhance diversity features between the command lane $110a$ and the monitor lane $120a$, the processor cores $210a$ and $220a$ are implemented with dissimilar core architectures Arch 1 and Arch 2.

Figure 1B:
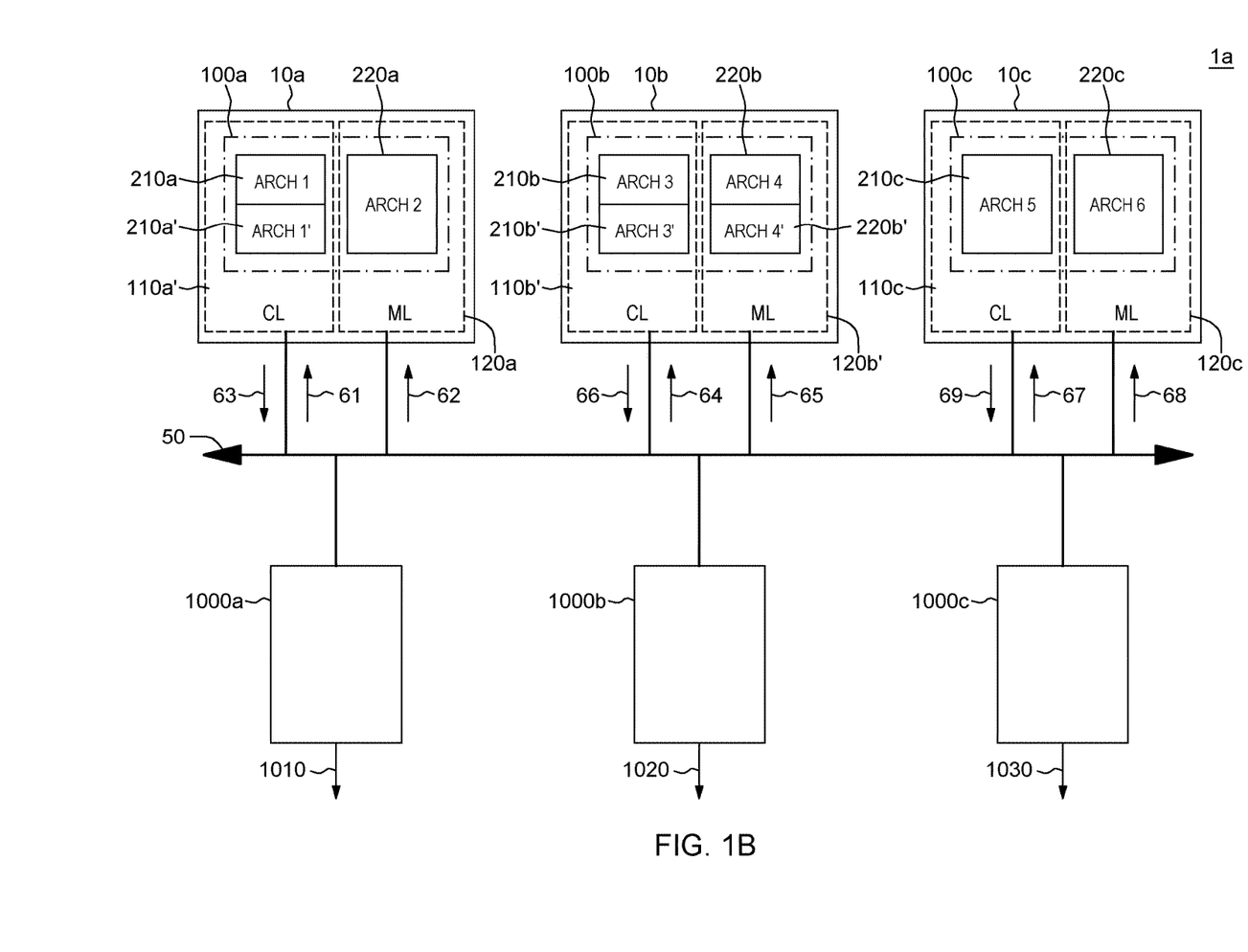
FIG. 1B depicts an example safety critical control system including a plurality of redundant computing channels according to an embodiment of the present disclosure.

Referring to FIG. 1B, a safety critical control system $1a$ in one embodiment includes two processor cores $210a$ and $210a'$ with respective core architectures Arch 1 and Arch 1' in the command lane $110a'$ and one processor $220a$ with a core architecture Arch 2 in the monitor lane $120a$. The system $1a$ accommodates a plurality of such cores such as having a processor core $210b$ with a core architecture Arch 3 and a processor core $210b'$ with a core architecture Arch 3' in the command lane $110b'$ and a processor core $220b$ with a core architecture Arch 4 and a processor core $220b'$ with a core architecture Arch 4' in the monitor lane $120b'$.

In a normal situation where there is no failure in the redundant computing channel $10a$, the command lane $110a$ and the monitor lane $120a$ may generate the same output; for example, the first output data of the command lane $110a$ is matched to the second output data of the monitor lane $120a$. In this case, the redundant computing channel $10a$ may output the first output data as command data 63 to an object control channel (OCC) $1000a$. On the other hand, in an abnormal situation where there exists at least one failure in the redundant computing channel $10a$, the command lane $110a$ and the monitor lane $120a$ may generate different outputs from each other; for example, the first output data of the command lane $110a$ is unmatched to the second output data of the monitor lane $120a$. In this case, the redundant computing channel $10a$ may not output the command data 63 and/or may provide an alert signal (not shown) indicating that the first output data of the command lane $110a$ is unmatched to the second output data of the monitor lane $120a$ to at least one of other redundant computing channels $10b$ and $10c$.

In the redundant computing channel $10b$, the command lane $110b$ may receive input data 64 related to the object system, process the input data 64 using a processor core $210b$ with a core architecture Arch 3, and generate first output data (not shown in FIG. 1A) based on the processed input data 64. In addition, the monitor lane $120b$ may receive input data 65 substantially the same as the input data 64, process the input data 65 using a processor core $220b$ with a core architecture Arch 4, and generate second output data (not shown in FIG. 1A) based on the processed input data 65. In one embodiment, to enhance diversity features between the command lane $110b$ and the monitor lane $120b$, the processor cores $210b$ and $220b$ are implemented with dissimilar core architectures Arch 3 and Arch 4.

In a normal situation where there is no failure in the redundant computing channel $10b$, the command lane $110b$ and the monitor lane $120b$ may generate the same output; for example, the first output data of the command lane $110b$ is matched to the second output data of the monitor lane $120b$. In this case, the redundant computing channel $10b$ may output command data 66 to an object control channel $1000b$. On the other hand, in an abnormal situation where there exists at least one failure in the redundant computing channel $10b$, the command lane $110b$ and the monitor lane $120b$ may generate different outputs from each other; for example, the first output data of the command lane $110b$ is unmatched to the second output data of the monitor lane 120b. In this case, the redundant computing channel 10b may not output the command data 66 and/or may provide an alert signal (not shown) indicating that the first output data of the command lane 110b is unmatched to the second output data of the monitor lane 120b to at least one of other redundant computing channels 10a and 10c.

In the redundant computing channel 10c, the command lane 110c may receive input data 67 related to the object system, process the input data 67 using a processor core 210c with a core architecture Arch 5, and generate first output data (not shown in FIG. 1A) based on the processed input data 67. In addition, the monitor lane 120c may receive input data 68 substantially the same as the input data 67, process the input data 68 using a processor core 220c with a core architecture Arch 6, and generate second output data (not shown in FIG. 1A) based on the processed input data 68. In one embodiment, to enhance diversity features between the command lane 110c and the monitor lane 120c, the processor cores 210c and 220c are implemented with dissimilar core architectures Arch 5 and Arch 6.

In a normal situation where there is no failure in the redundant computing channel 10c, the command lane 110c and the monitor lane 120c may generate the same output; for example, the first output data of the command lane 110c is matched to the second output data of the monitor lane 120c. In this case, the redundant computing channel 10c may output command data 69 to an object control channel 1000c. On the other hand, in an abnormal situation where there exists at least one failure in the redundant computing channel 10c, the command lane 110c and the monitor lane 120c may generate different outputs from each other; for example, the first output data of the command lane 110c is unmatched to the second output data of the monitor lane 120c. In this case, the redundant computing channel 10c may not output the command data 69 and/or may provide an alert signal (not shown) indicating that the first output data of the command lane 110c is unmatched to the second output data of the monitor lane 120c to at least one of other redundant computing channels 10a and 10b.

Although it is illustrated in FIG. 1A that the core architectures Arch 1 to Arch 6 are different for each of the redundant computing channels 10a to 10c, embodiments of the present disclosure are not limited thereto; for example, at least one core architecture used in one redundant computing channel can be used in another redundant computing channel. In a further particular example, the processor cores 110b and 120b (or the processor core 110c and 120c) of the redundant computing channel 100b (or the redundant computing channel 100c) may be implemented with the core architectures Arch 1 and Arch 2, respectively, used for the processor cores 110a and 120a in the redundant channel 100a.

In the present disclosure, the input data (e.g., 61, 64, or 67) include, but are not limited to: sensor data measured or sensed at various locations of the object system or data related to operations or status of the object system.

To perform comparison of the first output data of the command lane (e.g., 110a, 110b, or 110c) with the second output data of the monitor lane (e.g., 120a, 120b, or 120c) in each redundant computing channel 10a to 10c, in one embodiment, there may be a communication path between the command lane and the monitor lane to allow the first output data and/or the second output data to be exchanged therethrough. In this case, the monitor lane may send the second output data to the command lane, and the command lane may compare the second output data with the first output data. Next, if the first output data of the command lane and the second output data of the monitor lane are matched to each other, the command lane may determine that there is no failure in the corresponding redundant computing channel which the command lane and the monitor lane belong to, and thus the command lane may output command data (e.g., 63, 66, or 69) through the communication network 50. If the first output data of the command lane and the second output data of the monitor lane are not matched to each other, the command lane may determine that there exist one or more failures in the corresponding redundant computing channel, and thus may not output the command data. In this case, in an optional operation, the command lane may send an alert signal, which indicates that there is a failure in the corresponding redundant computing channel, to one or more of other redundant computing channels through the communication network 50. Further, in an optional operation, the one or more of the other redundant computing channels receiving the alert signal may take over tasks or operations of the redundant computing channel where the failure has occurred; in this particular example, the one or more of the redundant computing channels is referred to as slave mode channels and the redundant computing channel where the failure has occurred is referred to as a master mode channel.

In one embodiment, as shown in FIG. 2A, in a redundant computing channel 100', there may be a logic circuit 2040 that receives first output data 51 of a command lane 110' and second output data 52 of a monitor lane 120'. The command lane 110' has substantially the same configuration as any of the command lanes 110a, 110b, 110c (FIG. 1A), 110a', and 110b' (FIG. 1B), and the monitor lane 120' has substantially the same configuration as any of the monitor lanes 120a, 120b, 120c (FIG. 1A), and 120b' (FIG. 1B). The logic circuit 2040 may compare the first output data 51 with the second output data 52 and output the first output data 51 as command data 63' through the communication network 50 responsive to determining that the first output data 51 and the second output data 52 are matched to each other. On the other hand, if the first output data 51 and the second output data 52 are unmatched to each other, the logic circuit 2040 may not output the command data 63'. In this case, in an optional operation, the logic circuit 2040 may send an alert signal, which indicates that there is a failure in the corresponding redundant computing channel, to one or more of other redundant computing channels through the communication network 50. Further, in an optional operation, the one or more of the other redundant computing channels receiving the alert signal may take over tasks or operations of the redundant computing channel where the failure has occurred.

Figure 2B:
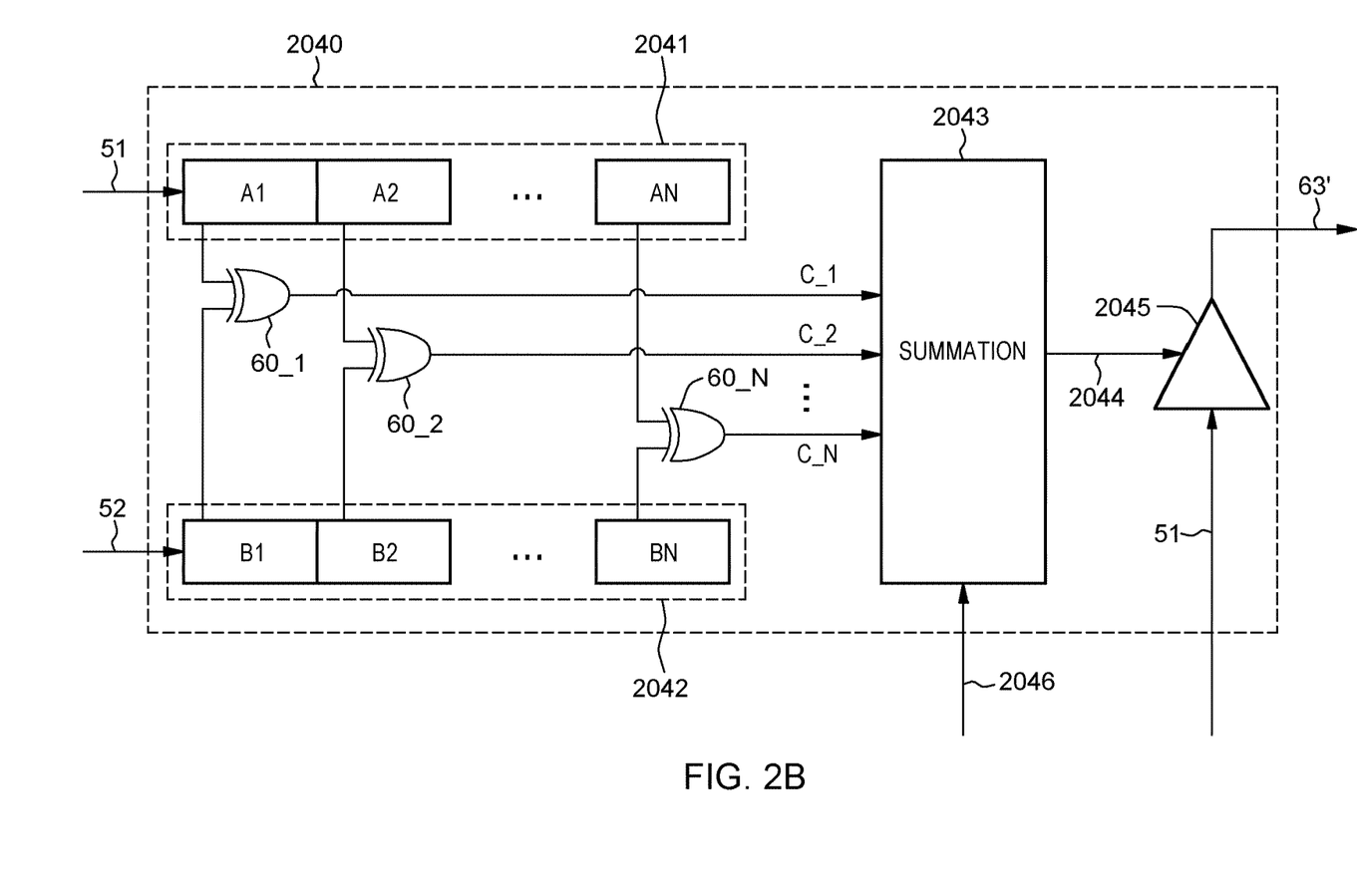
FIG. 2B depicts a block diagram of an example logic circuit of FIG. 2A according to an embodiment of the present disclosure.

In one embodiment, as depicted in the example of FIG. 2B, the logic circuit 2040 may be embodied to include input data registers 2041 and 2042, a plurality of exclusive OR logic (XOR) gates 60_1 to 60_N, a summation circuit 2043, and a buffer 2045. Here, N is an integer greater than 1 and is a bit length of the data 51 or 52. The data register 2041 may receive the first output data 51 by serially shifting and latching the data 51, and provide a corresponding bit as one input to each of the XOR logic gates 60_1 to 60_N. Similarly, the data register 2042 may receive the second output data 52 by serially shifting and latching the data 52, and provide a corresponding bit as another input to each of the XOR logic gates 60_1 to 60_N. Next, each XOR logic gates 60_1 to 60_N may output a value "1" if the corresponding bits of the first output data 51 and the second output data 52 are different, otherwise, output a value "0".

The summation circuit 2043 may sum the outputs C1 to C_N of the XOR logic gates 60_1 to 60_N and output an enable signal 2044 if the summation value is greater than a threshold value 2046. The buffer 2045 may output the command data 63' if the enable signal 2044 is present. Otherwise, the buffer 2045 may not output the command data 63'. For example, if the threshold value 2046 is set as "zero", at least one-bit difference between the first and second output data 51 and 52 may cause the logic circuit 2040 to determine an unmatch between the data 51 and 52. In another embodiment, the functions of the logic circuit 2040 may be embodied using a processor (not shown).

In the present disclosure, the command data (e.g., 63, 66, 69, or 63') are source data used by at least one of object control channels (e.g., 1000a, 1000b, 1000c) to generate an object control signal (e.g., 1010, 1020, 1030) to control the motions or operations of various parts (e.g., actuators) of the object system.

In one embodiment, as depicted in FIG. 1A, the object control channel 1000a generates an object control signal 1010 based on a selection algorithm from the command data 63, 66, and 69. The object control channel 1000b generates an object control signal 1020 based on the selection algorithm from the command data 63, 66, and 69. The object control channel 1000c generates an object control signal 1030 based on the selection algorithm from the command data 63, 66, and 69. In one embodiment, the selection algorithm includes receiving all three command data 63, 66, and 69 and selecting a median or average value of the command data 63, 66, and 69. In another embodiment, the selection algorithm used by each object control channel can also allow for selection of any one of the command data 63, 66, and 69; for example, if two of the three redundant computing channels (e.g., if 10a and 10b of FIG. 1A fail), each object control channel would use the command data 69 output from the channel 10c which remains healthy. In other embodiment, each object control channel generates an object control signal only based on its mapping command data. For example, the object control channel 1000a generates an object control signal 1010 only based on the command data 63, the object control channel 1000b generates an object control signal 1020 only based on the command data 66, and the object control channel 1000c generates an object control signal 1030 only based on the command data 69. Each object control signal 1010 to 1030 may be used to control the motions of various parts (e.g., actuators) of the object system.

The communication network 50 may include communications based on Internet, local area network (LAN), wide area network (WAN), code division multiple access (CDMA), global system for mobile communication (GSM), wideband CDMA, CDMA-2000, time division multiple access (TDMA), long term evolution (LTE), wireless LAN, Bluetooth, avionic standards (e.g., ARINC-429, ARINC 664, MIL-STD 1553, etc.), or the like.

In one embodiment, respective dissimilar processor cores employed in the command lane and the monitor lane of each redundant computing channels are implemented in a same multicore SOC device. Unlike the existing technology of implementing dissimilar processors into two or more separate devices, the multicore SOC device according to the present disclosure where the dissimilar core processors are implemented in a single silicon chip (or die) may allow the processor core processors corresponding to the command lane and the monitor lane to have similar or substantially same levels of performance metrics (e.g., throughput, power dissipation) to increase the degrees of safety and integrity of the safety critical control system and reduce SWAP-C (size, weight, area, power and cost) for the safety critical control system while preserving system safety. As shown in FIG. 1A, the redundant computing channel 10a includes a multicore SOC device 100a in which the dissimilar processor cores 210a and 220a are implemented. The redundant computing channel 10b includes a multicore SOC device 100b in which the dissimilar processor cores 210b and 220b are implemented. The redundant computing channel 10c includes a multicore SOC device 100c in which the dissimilar processor cores 210c and 220c are implemented.

In one embodiment, to further enhance the system safety, respective processor cores of the command lane and the monitor lane may process data based on further design diversity features which will be described later with reference to FIGS. 4, 5A, and 5B.

Figure 3:
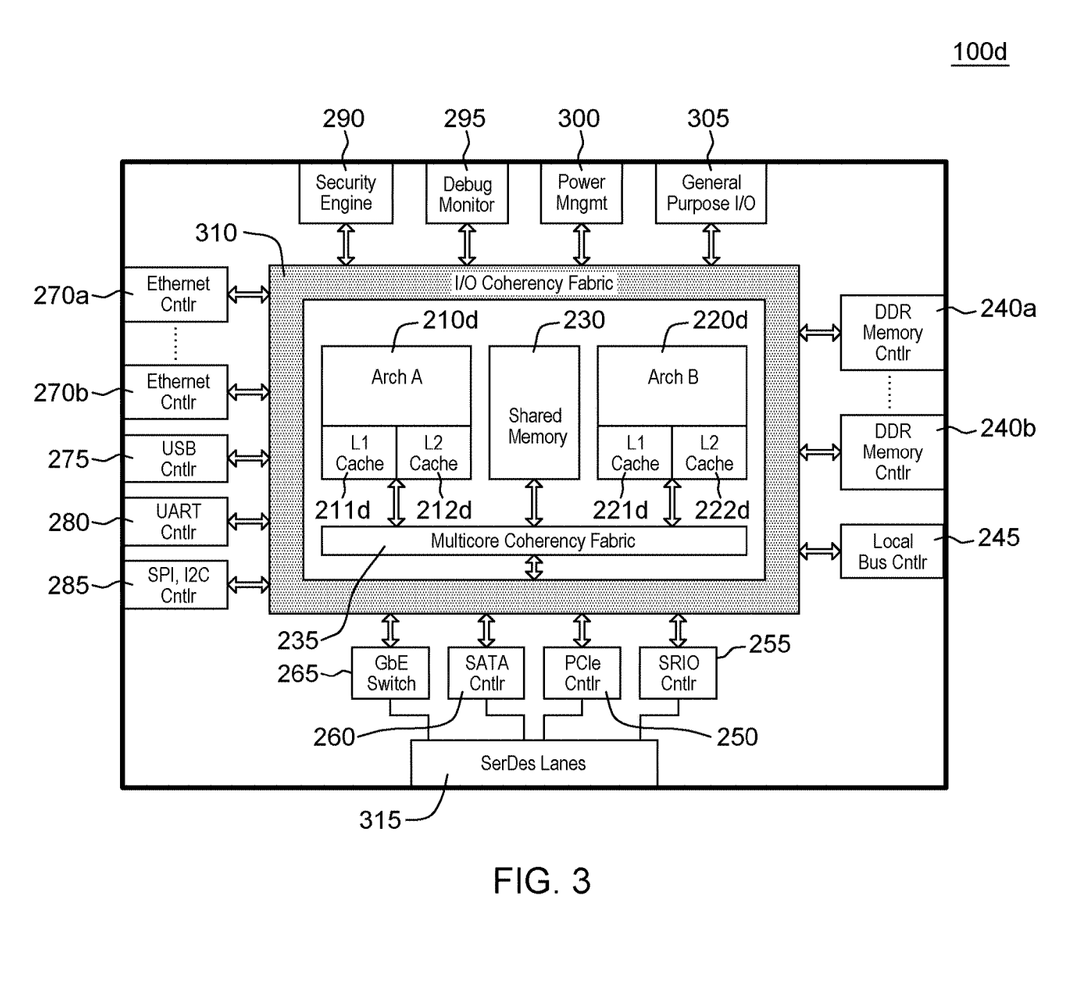
FIG. 3 is a block diagram of an example multicore SOC device according to an embodiment of the present disclosure.

FIG. 3 is a block diagram of an example multicore SOC device 100d according to an embodiment of the present disclosure. FIG. 4 depicts example diversity features used in a command lane and a monitor lane according to an embodiment of the present disclosure. FIG. 5A is a block diagram of the multicore SOC device 100d illustrating core architectures and diversity features used in a command lane according to an embodiment of the present disclosure. FIG. 5B is a block diagram of the multicore SOC device 100d illustrating core architectures and diversity features used in a monitor lane according to an embodiment of the present disclosure.

As depicted in the example of FIG. 3, two processor cores 210d and 220d having dissimilar core architectures are implemented in a same multicore SOC device 100d. For example, the processor core 210d has a core architecture Arch A, and the processor core 220d has a core architecture Arch B different from the core architecture Arch A. Although it is illustrated in FIG. 3 that a single core for each of the core architectures Arch A and Arch B is implemented in the multicore SOC device 100d, the present disclosure is not limited thereto and for example, more than one core for at least one of the core architectures Arch A and Arch B can be implemented in a multicore SOC device (e.g., two cores with the core architecture Arch A and two cores with the core architecture Arch B). In another example (not shown in figure), multiple cores with three or more dissimilar core architectures (e.g., one or more cores with the core architecture Arch A, one or more cores with the core architecture Arch B, one or more cores with a core architecture different from the architectures Arch A and Arch B) are implemented in a single multicore SOC device.

In one embodiment, the respective core architectures Arch A and Arch B of the processor cores 210d and 220d are selected from core architectures such as PowerPC®, an ARM®, a digital signal processing (DSP), a Xeon®, a Pentium®, a Core™ processor (e.g., Core i3, Core i5, Core i7), an ARC, an Alpha, an Am29000®, an Atmel® AVR, a Blackfin, an i960®, an MIPS®, a PA-RISC®, an RISC-V™, a SuperH®, and a SPARC®, a field-programmable gate array (FPGA) with multicore processors (e.g., Xilinx Ultrascale MPSOC), or the like.

In some aspects, one or more cache memories 211d and 212d (or 221d and 222d) may be used by the processor core 210d (or the processor core 220d) to reduce the latency to access data from a shared memory 230. In the example depicted in FIG. 3, the cache memories 211d and 212d are embodied with a L1 cache and a L2 cache, respectively, however exemplary embodiments of the present disclosure are not limited thereto. The shared memory 230 refers to a memory for storing the input data (e.g., 61, 62, 64, 65, 67, or 68) collected from the object system (not shown), and each of the processor cores 210*d* and 220*d* may read the input data from the shared memory 230, process the input data, generate output data based on the processed input data, and write the output data to the shared memory 230.

The SOC device 100*d* may further include a multicore coherency fabric 235 that provides interfaces for exchanging data between the processor cores 210*d* and 220*d* and allowing the processor cores 210*d* and 220*d* to access the shared memory 230.

The SOC device 100*d* may further include various peripherals such as, but are not limited to, one or more memory controllers 240*a* to 240*b*, a local bus controller 245, a peripheral component interconnect express (PCIe) bus controller 250, a serial I/O controller 255, a SATA controller 260, a gigabit Ethernet switch 265, one or more Ethernet controllers 270*a* to 270*b*, a universal serial bus (USB) controller 275, a universal asynchronous receiver/transmitter (UART) controller 280, a SPI,I2C controller 285, a security engine 290, a debug monitor module 295, a power management module 300, and a general purpose I/O module 305. An I/O coherence fabric 310 may provide interfaces for communications among the above-mentioned elements of the SOC device 100*d*.

In one embodiment, the one or more memory controllers 240*a* and 240*b* may be embodied with double-date rate (DDR) memory controllers that provide interfaces for accessing an external DDR synchronous DRAM (DDR SDRAM). For example, the DDR memory controller 240*a* may control the operations of a DDR2 SDRAM and the DDR memory controller 240*b* may controls the operation of a DDR3 SDRAM.

The PCIe bus controller 250, the serial I/O controller 255, the SATA controller 260, and the gigabit Ethernet switch 265 constitute high-speed data exchange I/O interface channels and are coupled to a corresponding lane of a serializer/deserializer (SerDes) 315 that facilitates the transmission of parallel data between two points over serial streams.

The respective processor cores 210*d* and 220*d* of the command lane and the monitor lane may process data based on design diversity features. For example, the processor core 210*d* processes data (e.g., 61, 64, or 67) based on a first set of diversity features, and the processor core 220*d* processes data (e.g., 62, 65, or 68) based on a second set of diversity features. At least one of the first set of diversity features may be different from a corresponding one of the second set of diversity features.

Figure 4:
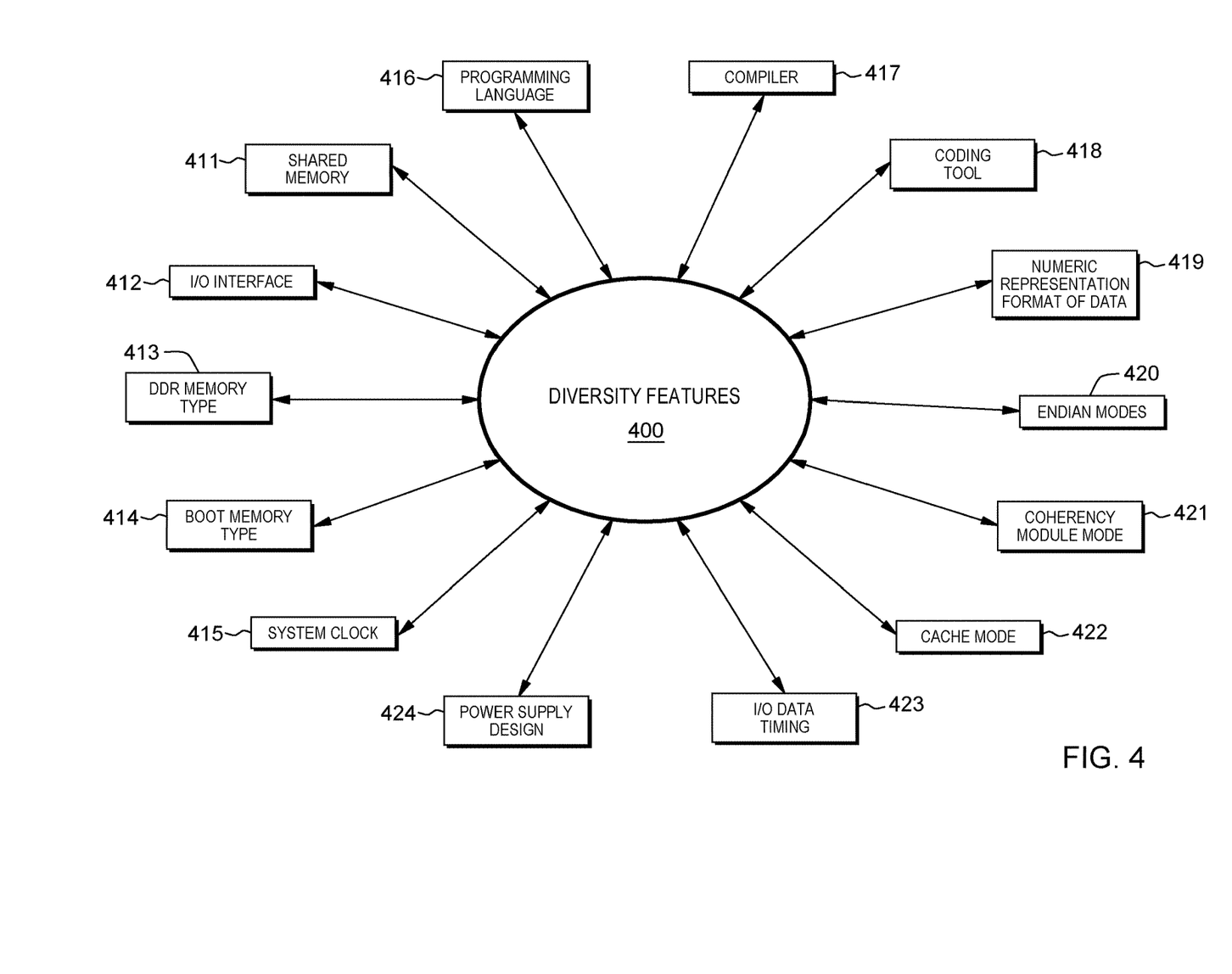
FIG. 4 depicts example diversity features used in a command lane and a monitor lane, according to an embodiment of the present disclosure.

As depicted in the example of FIG. 4, the diversity features 400 used or accessed by the processor cores 210*d* and 220*d* may be hardware or software resources including: portions of a shared memory 411, I/O interfaces 412, DDR memory types 413, boot memory types 414, system clocks 415, computer programming languages for coding 416, compilers 417, coding tools 418, numeric representation formats of data 419 for being stored and processed, endian modes 420, coherency module modes 421, cache modes 422, I/O data timings 423, power supply designs 424, or the like.

In one embodiment, with respect to the portions of the shared memory 411, the processor cores 210*d* and 220*d* access exclusively different portions of the shared memory (e.g., 230 of FIG. 3) to read and write data from/to the shared memory 230. For example, the processor core 210*d* accesses an upper half portion of the shared memory 230, and the processor core 220*d* accesses a lower half portion of the shared memory 230, as shown in FIG. 3; or vice versa.

In one embodiment, with respect to the I/O interfaces 412, the processor cores 210*d* and 220*d* use dissimilar I/O interfaces to each other. For example, the processor core 210*d* uses a PCIe bus 2510 as an I/O interface as shown in FIG. 5A, and the processor core 220*d* uses a local bus 2450 as the I/O interface, as shown in FIG. 5B; or vice versa.

In one embodiment, with respect to the DDR memory types 413, the processor cores 210*d* and 220*d* use dissimilar DDR memory types to each other. For example, the processor core 210*d* uses a DDR2 SDRAM 2420 as shown in FIG. 5A, and the processor core 220*d* uses a DDR3 SDRAM 2410 as shown in FIG. 5B; or vice versa.

In one embodiment, with respect to the boot memory types 414, the processor cores 210*d* and 220*d* use dissimilar boot memory types to each other. For example, the processor core 210*d* uses a boot memory 2520 coupled to the PCIe bus 2510 as shown in FIG. 5A, and the processor core 220*d* uses a boot memory 2460 coupled to the local bus 2450 as shown in FIG. 5B; or vice versa. In some embodiments, secure boot functions are used by both the processor cores 210*d* and 220*d*, in other embodiments, the secure boot functions are used by none of the processor cores 210*d* and 220*d*.

In one embodiment, with respect to the system clocks 415, the processor cores 210*d* and 220*d* use system clocks with dissimilar frequencies (e.g., clock cycles) to each other. For example, the processor core 210*d* uses a system clock 391 with a first frequency as shown in FIG. 5A, and the second group of processor core 220*d* uses a system clock 392 with a second frequency as shown in FIG. 5B.

Figure 5A:
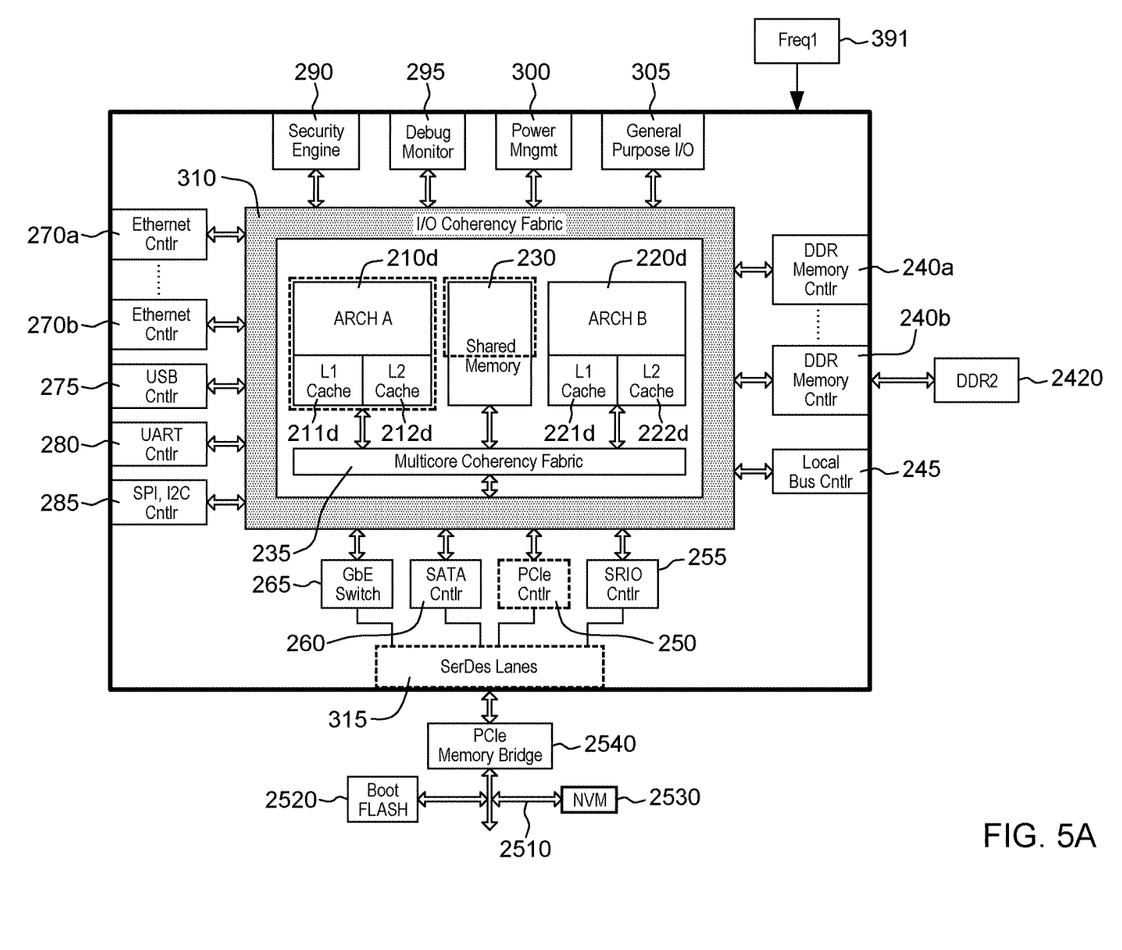
FIG. 5A is a block diagram of a multicore SOC device illustrating core architectures and diversity features used in a command lane according to an embodiment of the present disclosure.

In the particular example depicted in FIG. 5A, the PCIe controller 250 performs control for the PCIe bus 2510 coupled to a PCI express memory bridge 2540, a boot memory 2520, and a non-volatile memory 2530. The non-volatile memory 2530 may be embodied with a magnetoresistive random access memory (MRAM), a flash memory, a ferroelectric RAM (FRAM), etc. In addition, input data (e.g., 61, 64, or 67 of FIG. 1A) for being processed by the processor core 210*d* may be input via the PCIe bus interface 2510 and stored into a corresponding portion (e.g., the upper half) of the shared memory 230. The processor core 210*d* may access the corresponding portion of the shared memory 230 to read and process the input data, generate output data by processing the input data, and store the output data into the corresponding portion of the shared memory 230.

Figure 5B:
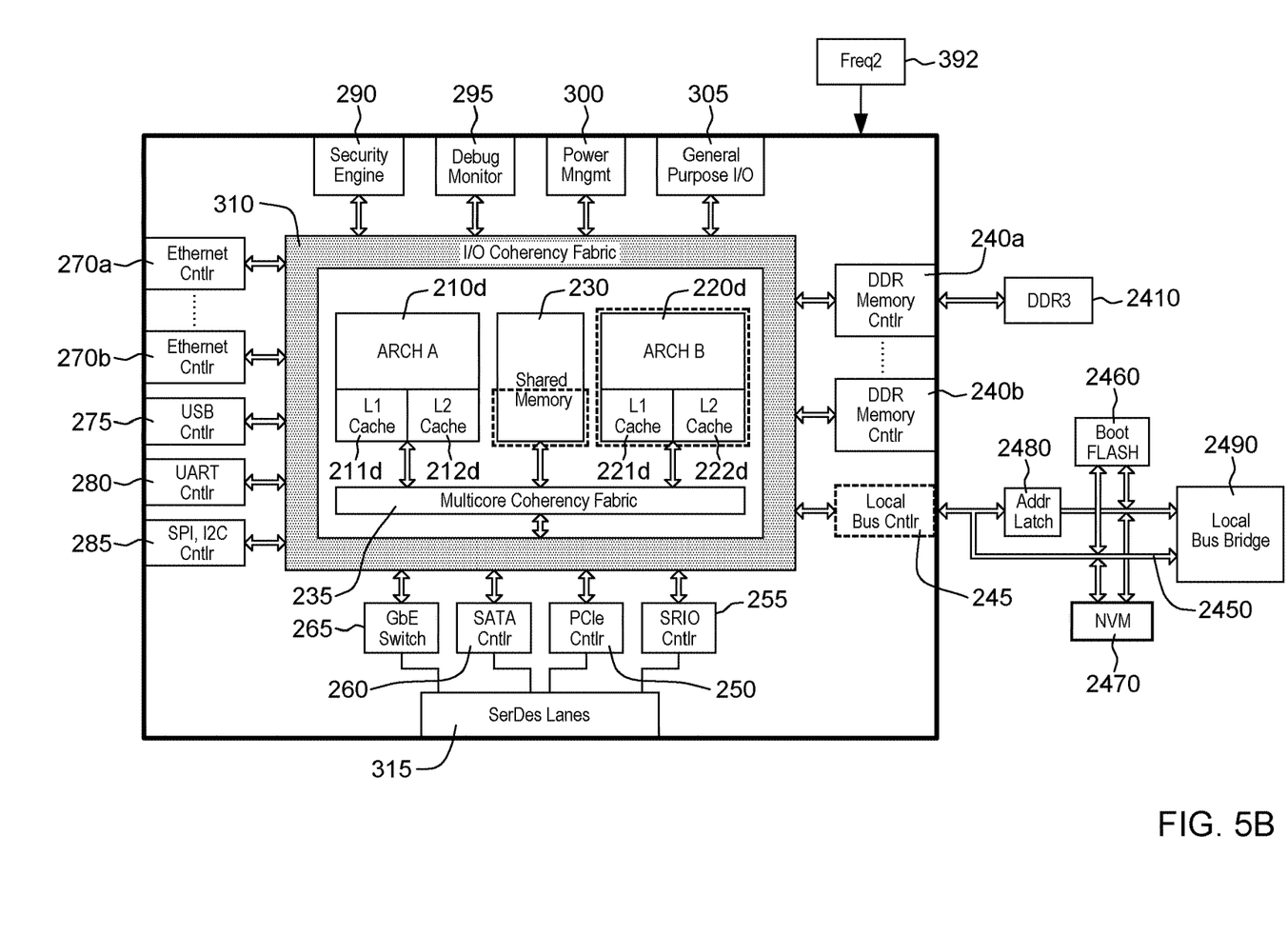
FIG. 5B is a block diagram of a multicore SOC device illustrating core architectures and diversity features used in a monitor lane according to an embodiment of the present disclosure.

In the particular example depicted in FIG. 5B, the local bus controller 245 performs control for the local bus 2450 coupled to a local bus memory bridge 2490, a boot memory 2460, a non-volatile memory 2470 (e.g., a MRAM, a flash memory, an FRAM, etc.), and an address latch 2480. In addition, input data for being processed by the processor core 220*d* may be input via the local bus interface 2450 and stored into a corresponding portion (e.g., lower half) of the shared memory 230. The processor core 220*d* may access the corresponding portion of the shared memory 230 to read and process the input data, generate output data by processing the input data, and store the output data into the corresponding portion of the shared memory 230.

Although not shown in FIGS. 5A and 5B, the processor cores 210*d* and 220*d* may process data based on further diversity features shown in FIG. 4.

In one embodiment, with respect to the computer programming languages 416, the processor cores 210*d* and 220*d* are controlled based on program instructions coded based dissimilar programming languages such as C, C++, Ada, Assembly, Java®, etc. For example, some portion of the program instructions is programmed in an assembly language to optimize performance for a unique function.

In one embodiment, with respect to the compilers 417, the processor cores 210d and 220d are controlled based on program instructions complied based on dissimilar compilers such as Green Hills®, Wind River, GNU, Code Warrior™, etc.

In one embodiment, with respect to the coding tools 418, the processor cores 210d and 220d are controlled based on program instructions coded based on dissimilar coding tools such as SCADE®, Matlab® Simulink, etc.

In one embodiment, with respect to the numeric representation formats of data 419, the input data and the output data of the processor core 210d are dissimilar to the input data and the output data of the processor core 220d. Examples of the numeric representation formats include a fixed point sliding B-scale, a fixed point with fixed B-scale, a 16-bit floating point, a 32-bit floating point, a 64-bit floating point, etc.

In one embodiment, with respect to the endian modes 420, the processor cores 210d and 220d use dissimilar endian modes to store data. Examples of the endian modes include a big endian mode (e.g., most significant bit (MSB)), a little endian mode (e.g., least significant bit (LSB)), etc.

In one embodiment, with respect to the coherency modes 421, the processor cores 210d and 220d use dissimilar coherency modes in terms of QoS arbitration policies to access interfaces (e.g., secure access vs shareable access; mater mode vs slave mode for a SOC and I/O functions).

In one embodiment, with respect to the cache modes 422, the processor cores 210d and 220d use dissimilar cache modes such as a non-cached mode, a write back mode, a write through mode, a read only cache mode, an individual line locking mode, a SRAM mode, a partial I/O stash mode, etc. For example, one of the processor cores 210d and 220d uses a cache mode, and another of the processor cores 210d and 220d turns the cache mode off.

In one embodiment, with respect to the I/O data timings 423, the processor cores 210d and 220d provide commands or perform I/O data processing in different time slots of a cyclic frame, a frequency modification via programmable multipliers, a serial transfer, and a parallel transfer.

In one embodiment, with respect to the power supply design 424, power supplies providing electrical power to the processor cores 210d and 220d are designed by multiple discrete devices (e.g., DC/DC point of load buck converter) or a single power sequencer device.

Figure 6:
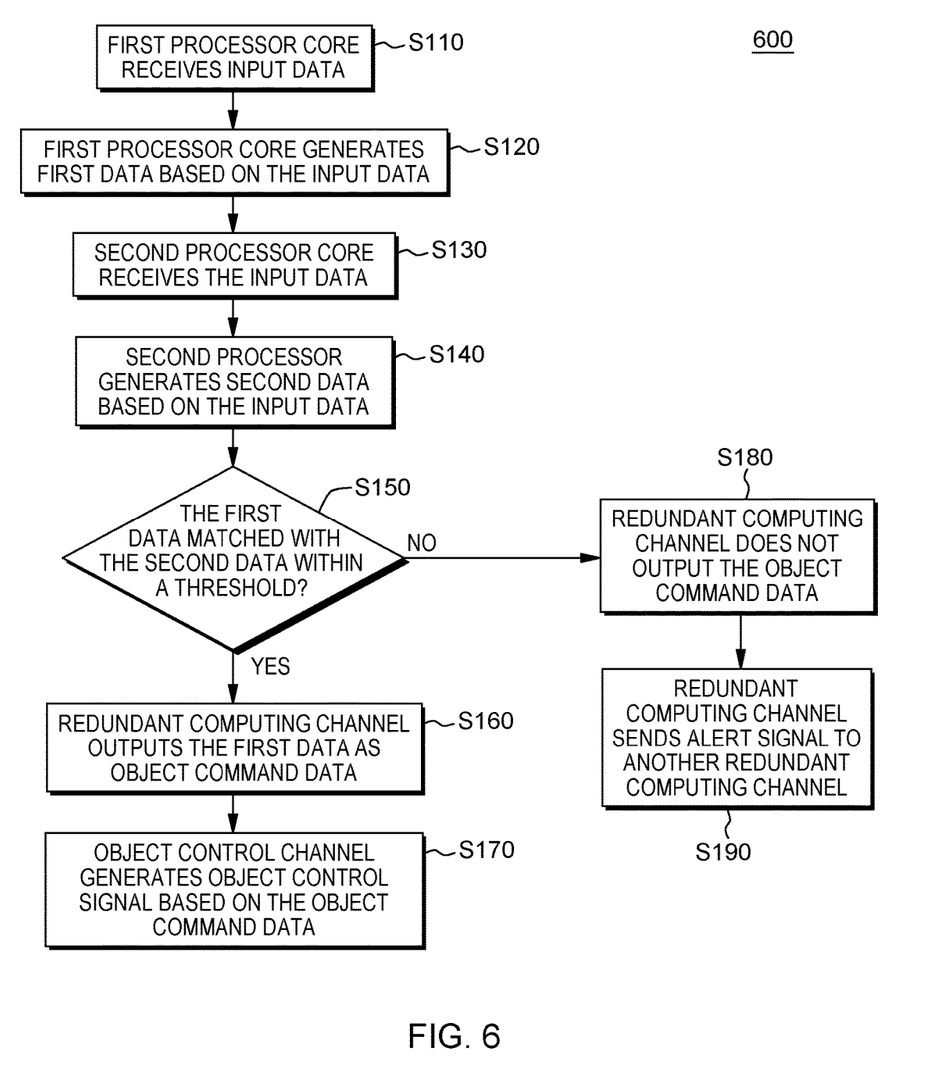
FIG. 6 is an example flow chart illustrating a method for operating a safety critical control system 1 according to an embodiment of the present disclosure.

FIG. 6 is an example flow chart depicting a method 600 for operating a safety critical control system 1 according to an embodiment of the present disclosure.

Referring to FIG. 6, the method 600 includes steps S110 to S190.

At a step S110, a first processor core (e.g., 210a of FIG. 1A) corresponding to a command lane (e.g., 110a of FIG. 1A) of a particular redundant computing channel (e.g., 10a of FIG. 1A) may receive first input data (e.g., 61 of FIG. 1A). Next, the first processor core may process the input data and generates first output data based on the processed first input data (S120).

At a step S130, a second processor core (e.g., 220a of FIG. 1A) corresponding to a monitor lane (e.g., 120a of FIG. 1A) of the redundant computing channel (e.g., 10a of FIG. 1A) may receive second input data (e.g., 62 of FIG. 1A). Next, the second processor core may process the second input data and generates second output data based on the processed second input data (S140).

Next, at a step S150, the first output data may be compared with the second output data. If it is determined that the first output data is matched to the second output data within a threshold (YES), the redundant computing channel may output the first output data as command data (e.g., 63 of FIG. 1A) at a step S160. An object control channel (e.g., 1000a) may generate an object control signal (e.g., 1010 of FIG. 1A) based on the command data to control the motions of various parts (e.g., actuators) of the object system at a step S170.

At a step S180, if it is determined that the first output data is not matched to the second output data (NO), the redundant computing channel may not output the command data. Further, in an optional operation, the redundant computing channel may send an alert signal, which indicates that there is a failure in the redundant computing channel, to another redundant computing channel through the communication network 50 at a step S190.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A control system, comprising:
   a computing channel including:
      a command lane having a first processor core with a first core architecture that receives input data and generates first data based on the input data; and
      a monitor lane having a second processor core with a second core architecture that receives the input data and generates second data based on the input data, the first core architecture and the second core architecture being dissimilar to each other and
   implemented in a single system-on chip device, the computing channel outputting the first data as command data responsive to determining the first data is matched to the second data; and
   an object control channel corresponding to the computing channel and including at least one object control system that receives the command data from the computing channel and generates an object control signal based on the command data to control operation of at least one part of an object system.

2. The control system of claim 1, further comprising a communication network used for transferring the input data, the command data, and the object control signal.

3. The control system of claim 1, wherein the first processor core processes the input data based on a first set of diversity features, and the second core architecture processes the input data based on a second set of diversity features dissimilar to the first set of diversity features.

4. The control system of claim 3, wherein the first set of diversity features is dissimilar to the second set of diversity features in at least one of: portions of a shared memory to be accessed; I/O interfaces, double data rate synchronous dynamic random-access memory types, boot memory types, system clocks to be used, computer programming languages for coding, compilers, coding tools, numeric representation formats of data, endian modes, coherency module modes, cache modes, I/O data timings, and power supply designs.

5. The control system of claim 4, wherein the first processor core uses one of a PCI express bus and a local bus as the I/O interface, and the second processor core uses another of the PCI express bus and the local bus as the I/O interface.

6. The control system of claim 1, wherein the first core architecture and the second core architecture respectively correspond to two dissimilar architectures selected from a group comprising: a PowerPC, an ARM, and a digital signal processing, a Xeon, a Pentium, a Core, an ARC, an Alpha, an Am29000, an Atmel AVR, a Blackfin, an i960, an MIPS, a PA-RISC, an RISC-V, a SuperH, a scalable processor architecture, and a field-programmable gate array with multicore processors.

7. The control system of claim 1, wherein the computing channel does not output the command data responsive to determining the first data is not matched to the second data.

8. The control system of claim 7, wherein the control system further comprises another computing channel, said computing channel further sends an alert signal to said another computing channel responsive to determining the first data is not matched to the second data, the alert signal indicating that said computing channel has a failure.

9. The control system of claim 1, further comprising at least one additional processor core having an additional core architecture in at least one of said command lane and said monitor lane.

10. A computing system, comprising:
a command lane having a first processor core with a first core architecture that receives input data and generates first data based on the input data;
a monitor lane having a second processor core with a second core architecture dissimilar to the first core architecture that receives the input data and generates second data based on the input data, the first core architecture and the second core architecture being implemented in a single system-on chip device; and
a control logic receiving the first data and the second data and outputting the first data as command data responsive to determining the first data is matched to the second data.

11. The computing system of claim 10, wherein the first core architecture processes the input data based on a first set of diversity features, and the second core architecture processes the input data based on a second set of diversity features dissimilar to the first set of diversity features.

12. The computing system of claim 11, wherein the first set of diversity features used by the first processor core is different from the second set of diversity features used by the second processor core in at least one of: portions of a shared memory to be accessed; I/O interfaces, double data rate synchronous dynamic random-access memory types, boot memory types, system clocks to be used, computer programming languages for coding, compilers, coding tools, numeric representation formats of data, endian modes, coherency module modes, cache modes, I/O data timings, power supply designs.

13. The computing system of claim 12, wherein the first processor core uses one of a PCI express bus and a local bus as the I/O interface and the second processor core uses another of the PCI express bus and the local bus as the I/O interface.

14. The computing system of claim 10, wherein the first core architecture and the second core architecture correspond to two dissimilar architectures selected from a PowerPC, an ARM, and a digital signal processing, a Xeon, a Pentium, a Core, an ARC, an Alpha, an Am29000, an Atmel AVR, a Blackfin, an i960, an MIPS, a PA-RISC, an RISC-V, a SuperH, a scalable processor Architecture, and a field-programmable gate array with multicore processors.

15. The computing system of claim 10, wherein the control logic outputs the command data responsive to determining the first data is not matched to the second data.

16. The computing system of claim 15, wherein the control logic further sends an alert to another computing system responsive to determining the first data is not matched to the second data, the alert signal indicating that said computing channel has a failure.

17. A computer-implemented method of operating a control system including a computing channel having a command lane and a monitor lane, comprising:
receiving, by a first processor core of the command lane, input data, the first processor core with a first core architecture;
generating, by the first processor core, first data based on the input data;
receiving, by a second core processor of the monitor lane, the input data, the second processor core with a second core architecture dissimilar to the first core architecture;
generating, by the second processor core, second data based on the input data, the first core architecture and the second core architecture being implemented in a single system-on chip device; and
outputting, by the computing channel, the first data as command data upon determining the first data is matched to the second data.

18. The computer-implemented method of claim 17, further comprising:
receiving, by an object control system, the command data; and
generating, by the object control system, an object control signal based on the command data to control operation of at least one part of an object system.

19. The computer-implemented method of claim 17, further comprising:
outputting, by the computing channel, no command data responsive to determining the first data is not matched to the second data.

20. The computer-implemented method of claim 19, further comprising:
sending, by the computing channel, an alert signal to another computing channel responsive to determining the first data is not matched to the second data, the alert signal indicating that the computing channel has a failure.

21. The computer-implemented method of claim 17, wherein the first processor core processes the input data based on a first set of diversity features, and the second core architecture processes the input data based on a second set of diversity features dissimilar to the first set of diversity features.

* * * * *